(12) United States Patent
Fang et al.

(10) Patent No.: US 8,711,669 B2
(45) Date of Patent: Apr. 29, 2014

(54) XDSL SYSTEM AND SIGNAL TRANSMISSION METHOD, SENDING DEVICE, AND RECEIVING DEVICE OF XDSL SYSTEM

(75) Inventors: Liming Fang, Santa Clara, CA (US); Jie Lv, Shenzhen (CN); Huishen Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 13/484,760

(22) Filed: May 31, 2012

(65) Prior Publication Data

US 2012/0237012 A1 Sep. 20, 2012

Related U.S. Application Data

(63) Continuation of application No. PCT/CN2011/074964, filed on May 31, 2011.

(30) Foreign Application Priority Data

Aug. 11, 2010 (CN) .......................... 2010 1 0253724

(51) Int. Cl.
H04M 11/00 (2006.01)

(52) U.S. Cl.
USPC ........................... 370/201; 370/252; 379/417

(58) Field of Classification Search
CPC ................................ H04M 11/00; H04J 15/00
USPC .......................................... 379/417; 375/222
See application file for complete search history.

(56) References Cited

U.S. PATENT DOCUMENTS 5,991,269 A * 11/1999 Williamson et al. .......... 370/241

| | | | |
|---|---|---|---|
| 6,192,109 B1 * | 2/2001 | Amrany et al. ................. | 379/30 |
| 2009/0116376 A1 | 5/2009 | Fang | |
| 2009/0147666 A1 | 6/2009 | Fang et al. | |
| 2012/0237012 A1 * | 9/2012 | Fang et al. ................. | 379/93.01 |

FOREIGN PATENT DOCUMENTS

| CN | 101106435 A | 1/2008 |
|---|---|---|
| CN | 101136659 A | 3/2008 |
| CN | 101471696 A | 7/2009 |
| CN | 101917212 A | 12/2010 |
| CN | 102244528 A | 11/2011 |
| EP | 1 998 464 A1 | 12/2008 |
| WO | WO 03/098850 A1 | 11/2003 |
| WO | WO 2008/145537 A1 | 12/2008 |

OTHER PUBLICATIONS

Supplementary European Search Report dated Dec. 7, 2012 in connection with European Patent Application No. EP 11 78 9199.
Sumanth Jagannathan et al., "Common-Mode Data Transmission Using the Binder Sheath in Digital Subscriber Lines", IEEE Transactions on Communications, vol. 57, No. 3, Mar. 2009, p. 831-840.
English-language International Search Report, issued by The State Intellectual Property Office, the P.R. China in International Application No. PCT/CN2011/074964, mailed Sep. 8, 2011, (3 pages).
Bin Lee et al., "Binder MIMO Channels", IEEE Transactions on Communications, vol. 55, No. 8, pp. 1617-1628 (2007).
Written Opinion of the International Searching Authority dated Sep. 8, 2011 in connection with International Patent Application No. PCT/CN2011/074964.

* cited by examiner

Primary Examiner — Creighton Smith

(57) ABSTRACT

An xDSL signal transmission method includes: receiving 2N−1 signals from 2N−1 signal input ends, where each signal in the 2N−1 signals is a signal transmitted by an independent channel in the xDSL system; pre-multiplying a (2N−1)×1 matrix formed by the 2N−1 signals by a first conversion matrix to obtain a 2N×1 matrix, where elements in the 2N×1 matrix respectively correspond to 2N signals, and the first conversion matrix is a 2N×(2N−1) matrix; and sending the 2N signals via N twisted pair lines respectively. The N twisted pair lines can transmit signals of 2N−1 channels, thereby increasing the number of signal transmissions, and improving signal transmission efficiency.

12 Claims, 9 Drawing Sheets

XDSL SYSTEM AND SIGNAL TRANSMISSION METHOD, SENDING DEVICE, AND RECEIVING DEVICE OF XDSL SYSTEM

CROSS-REFERENCE TO RELATED APPLICATIONS

This application is a continuation of International Application No. PCT/CN2011/074964, filed on May 31, 2011, which claims priority to Chinese Patent Application No. 201010253724.9, filed with the Chinese Patent Office on Aug. 11, 2010 and entitled "xDSL SYSTEM AND SIGNAL TRANSMISSION METHOD, SENDING DEVICE, AND RECEIVING DEVICE OF xDSL SYSTEM", both of which are incorporated herein by reference in their entireties.

FIELD OF THE INVENTION

The present invention relates to the field of communications technologies, and in particular, to an xDSL system and a signal transmission method, sending device, and receiving device of the xDSL system. The xDSL is a common name of digital subscriber line (Digital Subscriber Line, DSL for short) technologies.

BACKGROUND OF THE INVENTION

A twisted pair line is a type of common line distribution produced by twisting two mutually insulated conducting wires together according to a certain specification, and belongs to transmission media of an information communication network. Twisted pair lines may be classified into shielded twisted pair lines (Shielded Twisted Pair, STP for short) and unshielded twisted pair lines (Unshielded Twisted Pair, UTP for short).

In a conventional xDSL technology, N twisted pair lines are generally used for transmitting signals of N channels.

Such a signal transmission method can transmit a small number of signals and has low efficiency. Therefore, how to transmit more signals via N twisted pair lines to improve signal transmission efficiency is a problem to be solved.

SUMMARY OF THE INVENTION

Embodiments of the present invention provide an xDSL system and a signal transmission method, sending device, and receiving device of the xDSL system, so as to solve the problem of low signal transmission efficiency in the prior art.

An embodiment of the present invention provides a signal transmission method in an xDSL system, including:

receiving $2N-1$ signals from $2N-1$ signal input ends, where each signal in the $2N-1$ signals is a signal transmitted by each independent channel in the xDSL system; and pre-multiplying a $(2N-1)\times 1$ matrix formed by the $2N-1$ signals by a first conversion matrix to obtain a $2N\times 1$ matrix, where elements in the $2N\times 1$ matrix respectively correspond to $2N$ signals, and the first conversion matrix is a $2N\times(2N-1)$ matrix; and sending the $2N$ signals via N twisted pair lines respectively, where N is a natural number greater than 1.

An embodiment of the present invention further provides a signal transmission method in an xDSL system, including:

receiving $2N$ signals via $2N$ signal receiving ends that are respectively connected with N twisted pair lines; and pre-multiplying a $2N\times 1$ matrix formed by the $2N$ signals by a third conversion matrix to obtain a $(2N-1)\times 1$ matrix, where elements in the $(2N-1)\times 1$ matrix respectively correspond to $2N-1$ signals; the third conversion matrix is a $(2N-1)\times 2N$ matrix; each signal in the $2N-1$ signals is a signal transmitted by each independent channel in the xDSL system; and N is a natural number greater than 1.

An embodiment of the present invention further provides a signal sending device in an xDSL system, including:

$2N-1$ signal input ends, respectively configured to receive a signal transmitted by each independent channel in the xDSL system;

a first conversion module, configured to pre-multiply a $(2N-1)\times 1$ matrix formed by $2N-1$ signals by a first conversion matrix to obtain a $2N\times 1$ matrix, where elements in the $2N\times 1$ matrix respectively correspond to $2N$ signals, and the first conversion matrix is a $2N\times(2N-1)$ matrix; and $2N$ signal sending ends, respectively connected with a conducting wire in N twisted pair lines, and configured to send $2N$ signals obtained by the first conversion module via a conducting wire of the N twisted pair lines respectively, where N is a natural number greater than 1.

An embodiment of the present invention further provides a signal receiving device in an xDSL system, including:

$2N$ signal receiving ends, respectively connected with a conducting wire in N twisted pair lines, and configured to receive $2N$ signals;

a second conversion module, configured to pre-multiply a $2N\times 1$ matrix formed by the $2N$ signals by a third conversion matrix to obtain a $(2N-1)\times 1$ matrix, where elements in the $(2N-1)\times 1$ matrix respectively correspond to $2N-1$ signals; the third conversion matrix is a $(2N-1)\times 2N$ matrix; each signal in the $2N-1$ signals is a signal transmitted by each independent channel in the xDSL system; and N is a natural number greater than 1.

An embodiment of the present invention further provides an xDSL signal transmission system, which includes N twisted pair lines, and the signal sending device and signal receiving device as mentioned previously, where $2N$ signal sending ends of the signal sending device are respectively connected with a conducting wire of the N twisted pair lines, and $2N$ signal receiving ends of the signal receiving device are respectively connected with a conducting wire of the N twisted pair lines.

In the embodiments of the present invention, since each sending and is connected with a conducting wire in each twisted pair line, a $(2N-1)\times 1$ matrix formed by $2N-1$ signals is pre-multiplied by a first conversion matrix to obtain a $2N\times 1$ matrix, where elements in the $2N\times 1$ matrix respectively correspond to $2N$ signals, and the $2N$ signals is transmitted by N twisted pair lines. In this way, the N twisted pair lines can transmit signals of $2N-1$ independent channels, thereby increasing the number of signal transmissions, and improving signal transmission efficiency.

BRIEF DESCRIPTION OF THE DRAWING

To illustrate the technical solutions in the embodiments of the present invention or in the prior art more clearly, the accompanying drawings required for describing the embodiments or the prior art are introduced below briefly. Apparently, the accompanying drawings in the following descriptions are merely some embodiments of the present invention, and persons of ordinary skill in the art may further obtain other drawings according to these accompanying drawings without creative efforts.

DETAILED DESCRIPTION OF THE EMBODIMENTS

In order to make the objectives, the technical solutions, and the advantages of the present invention more comprehensible, the technical solutions of embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
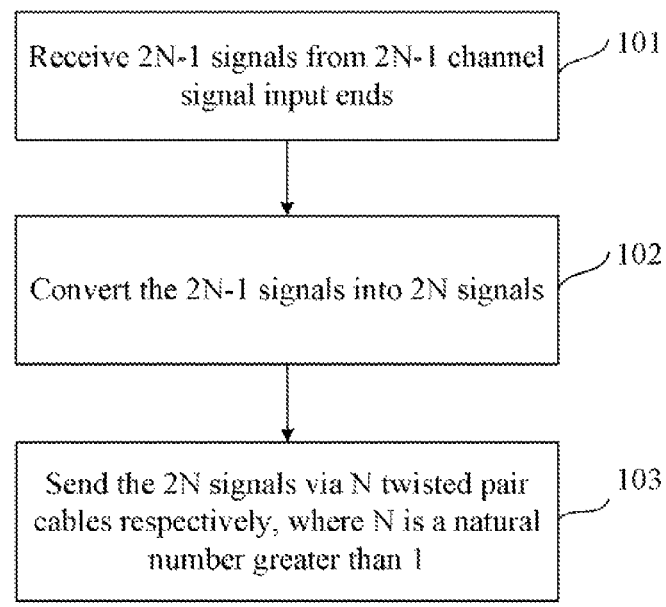
FIG. 1 is a flow chart of a first embodiment of a signal transmission method in an xDSL system according to the present invention.

FIG. 1 is a flow chart of a first embodiment of a signal transmission method in an xDSL system according to the present invention. As shown in FIG. 1, the method includes the following.

Step 101: Receive 2N−1 signals from 2N−1 signal input ends. In the embodiment of the present invention, each of the 2N−1 signals received from the signal input ends is a signal transmitted by each independent channel in the xDSL system.

Step 102: Convert 2N−1 signals into 2N signals. The step may specifically include: pre-multiplying a (2N−1)×1 matrix formed by the 2N−1 signals by a first conversion matrix to obtain a 2N×1 matrix, where elements in the 2N×1 matrix correspond to 2N signals respectively, and the first conversion matrix is a 2N×(2N−1) matrix.

Step 103: Send 2N signals via N twisted pair lines respectively, where N is a natural number greater than 1.

In addition, if n twisted pair line(s) is/are broken, 2N−1−2n signals may be received from 2N−1−2n signal input ends in 2N−1 signal input ends; the 2N−1−2n signals are converted into 2N−2n signals; and 2N−2n signals are sent via N−n twisted pair lines respectively, where n is a natural number less than N. The step may specifically include: pre-multiplying a (2N−1−2n)×1 matrix formed by the 2N−1−2n signals by a second conversion matrix to obtain a (2N−2n)×1 matrix, where elements in the (2N−2n)×1 matrix correspond to 2N−2n signals respectively, and the second conversion matrix is a (2N−2n)×(2N−1−2n) matrix.

Figure 2:
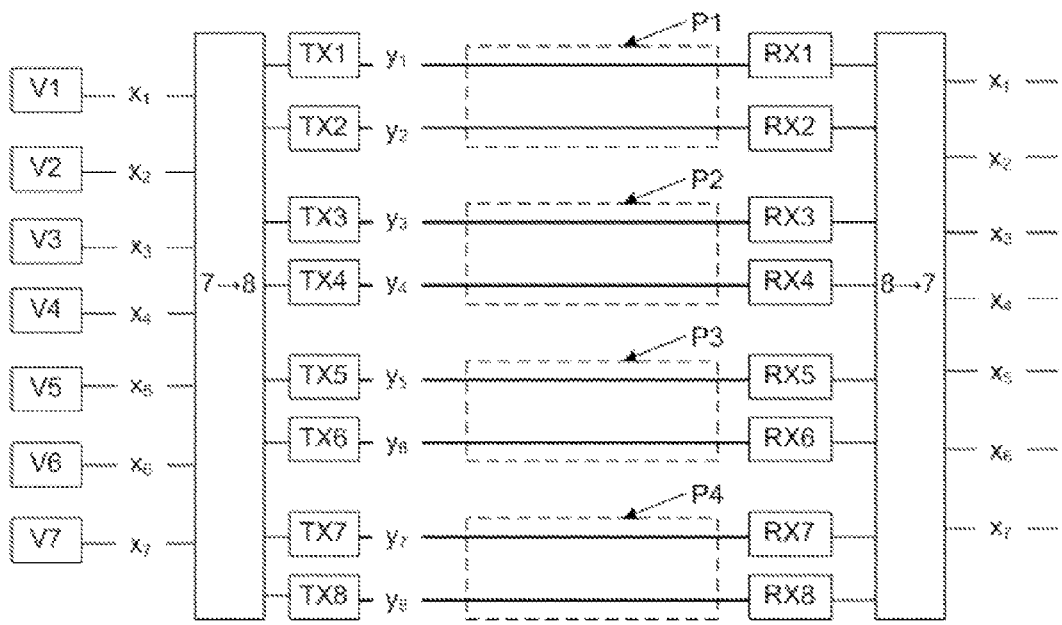
FIG. 2 is a schematic diagram of a first embodiment of the signal transmission method in the xDSL system according to the present invention.

FIG. 2 is a schematic diagram of a first embodiment of the signal transmission method in the xDSL system according to the present invention. It is assumed that signals of 7 (that is, the value of N in the embodiment is 4) channels exist, signals $x_1, x_2, x_3, x_4, x_5, x_6$, and $x_7$ of the 7 channels are respectively input into 7 signal input ends, V1, V2, . . . , and V7, and then the 7 signals are converted into 2×4=8 signals. Specifically, a 7×1 matrix formed by the 7 signals may be pre-multiplied by a first conversion matrix to obtain an 8×1 matrix, where the first conversion matrix may be an 8×7 matrix. 8 elements in the 8×1 matrix respectively correspond to 8 signals. The converted 8 signals are respectively $y_1, y_3, y_4, y_5, y_6, y_7$ and $y_8$. The 8 signals are sent respectively via 8 signal sending ends, and the 8 signal sending ends are respectively TX1, TX2, TX3, TX4, TX5, TX6, TX7, and TX8. Each of the 8 signal sending ends is respectively connected with a conducting wire in 4 twisted pair lines P1, P2, P3, and P4.

A design process of the first conversion matrix may be as follows.

First, an 8×4 matrix may be generated as follow:

$$\begin{pmatrix} 1 & 0 & 0 & 0 \\ -1 & 0 & 0 & 0 \\ 0 & 1 & 0 & 0 \\ 0 & -1 & 0 & 0 \\ 0 & 0 & 1 & 0 \\ 0 & 0 & -1 & 0 \\ 0 & 0 & 0 & 1 \\ 0 & 0 & 0 & -1 \end{pmatrix} \quad (1)$$

In the matrix (1), each row represents one conducting wire in a twisted pair line, and each column represents a signal sent by a signal sending end. Numeric values of the first column in the first two rows are respectively 1 and −1, and a sum of the two numeric values is 0. In this way, a differential signal may be represented, that is, a first conducting wire and a second conducting wire are combined to transmit a differential signal, which is the same as a common signal transmission manner in twisted pair lines. In the first two rows, each element except for the first column is 0, which indicates that another sent signal is not superposed on the first two conducting wires. In matrix (1), starting from the first row, every two rows represent a twisted pair line. Numeric values in column 2 in the third row and fourth row are respectively 1 and −1, which indicates that signals in the second channel are transmitted in the second twisted pair line.

An 8×3 matrix is further generated as follows:

$$\begin{pmatrix} 0.5 & 0 & 0.25 \\ 0.5 & 0 & 0.25 \\ -.05 & 0 & 0.25 \\ -0.5 & 0 & 0.25 \\ 0 & 0.5 & -0.25 \\ 0 & 0.5 & -0.25 \\ 0 & -0.5 & -0.25 \\ 0 & -0.5 & -0.25 \end{pmatrix} \quad (2)$$

In the matrix (2), each row represents a conducting wire, and each column represents a signal sent by a signal sending end. A value of each element indicates a size of a signal sent on a corresponding channel in the twisted pair line. In the matrix, a sum of elements of each column may be 0, and the number of positive numbers is the same as the number of negative numbers in each column. For example, a sum of all elements in the first column is 0, which indicates that signals of the channel are dispersed into four conducting wires for transmission, and signals transmitted in every two conducting wires form a differential signal.

An 8×7 matrix may be obtained by merging the matrix (1) and the matrix (2) as follows:

$$\begin{pmatrix} 1 & 0 & 0 & 0 & 0.5 & 0 & 0.25 \\ -1 & 0 & 0 & 0 & 0.5 & 0 & 0.25 \\ 0 & 1 & 0 & 0 & -0.5 & 0 & 0.25 \\ 0 & -1 & 0 & 0 & -0.5 & 0 & 0.25 \\ 0 & 0 & 1 & 0 & 0 & 0.5 & -0.25 \\ 0 & 0 & -1 & 0 & 0 & 0.5 & -0.25 \\ 0 & 0 & 0 & 1 & 0 & -0.5 & -0.25 \\ 0 & 0 & 0 & -1 & 0 & -0.5 & -0.25 \end{pmatrix} \quad (3)$$

The matrix (3) is the first conversion matrix, and the 7×1 matrix formed by signals $x_1$, $x_2$, $x_3$, $x_4$, $x_5$, $x_6$, and $x_7$ is pre-multiplied by the first conversion matrix to obtain 8 signals $y_1$, $y_2$, $y_3$, $y_4$, $y_5$, $y_6$, $y_7$ and $y_8$. The specific pre-multiplication operation is as follows:

$$\begin{bmatrix} y_1 \\ y_2 \\ y_3 \\ y_4 \\ y_5 \\ y_6 \\ y_7 \\ y_8 \end{bmatrix} = \begin{pmatrix} 1 & 0 & 0 & 0 & 0.5 & 0 & 0.25 \\ -1 & 0 & 0 & 0 & 0.5 & 0 & 0.25 \\ 0 & 1 & 0 & 0 & -0.5 & 0 & 0.25 \\ 0 & -1 & 0 & 0 & -0.5 & 0 & 0.25 \\ 0 & 0 & 1 & 0 & 0 & 0.5 & -0.25 \\ 0 & 0 & -1 & 0 & 0 & 0.5 & -0.25 \\ 0 & 0 & 0 & 1 & 0 & -0.5 & -0.25 \\ 0 & 0 & 0 & -1 & 0 & -0.5 & -0.25 \end{pmatrix} * \begin{bmatrix} x_1 \\ x_2 \\ x_3 \\ x_4 \\ x_5 \\ x_6 \\ x_7 \end{bmatrix} = \quad (4)$$

$$\begin{bmatrix} x_1 + 0.5x_5 + 0.25x_7 \\ -x_1 + 0.5x_5 + 0.25x_7 \\ x_2 - 0.5x_5 + 0.25x_7 \\ -x_2 - 0.5x_5 + 0.25x_7 \\ x_3 + 0.5x_6 - 0.25x_7 \\ -x_3 + 0.5x_6 - 0.25x_7 \\ x_4 - 0.5x_6 - 0.25x_7 \\ -x_4 - 0.5x_6 - 0.25x_7 \end{bmatrix}$$

Since each signal sending end is connected with a conducting wire in the 4 twisted pair lines, the 8 signals may be sent.

If a certain twisted pair line is broken, for example, if the second twisted pair line P2 is broken, at this time, the number of signals of channels capable of being transmitted changes to 2×4−1−2=5. 5 signals are received from 2*4−1−2*1=5 signal input ends in 7 signal input ends, and the 5 signals are converted into 2*4−2*1=6 signals. The 5 signals may be converted into 6 signals through the second conversion matrix.

Figure 3:
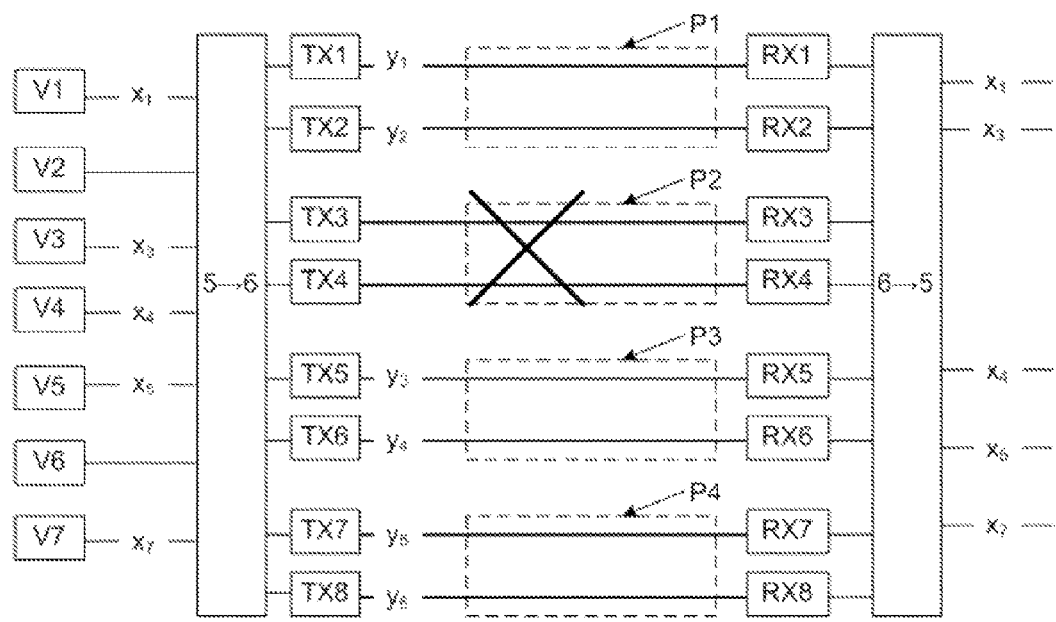
FIG. 3 is a schematic diagram of a situation occurring after a second twisted pair line is broken in a first embodiment of the signal transmission method in the xDSL system according to the present invention.

FIG. 3 shows a schematic diagram of a situation occurring after the second twisted pair line is broken in a first embodiment of the signal transmission method in the xDSL system according to the present invention. The second conversion matrix may be as follows:

$$\begin{bmatrix} 1 & 0 & 0 & 0.5 & 0.25 \\ -1 & 0 & 0 & 0.5 & 0.25 \\ 0 & 1 & 0 & -0.5 & 0.25 \\ 0 & -1 & 0 & -0.5 & 0.25 \\ 0 & 0 & 1 & 0 & -0.5 \\ 0 & 0 & -1 & 0 & -0.5 \end{bmatrix} \quad (5)$$

A 5×1 matrix formed by five signals $x_1$, $x_3$, $x_4$, $x_5$, and $x_7$ is pre-multiplied by a matrix (5) to obtain 6 signals.

If no twisted pair line is broken, during signal transmission, signals are sent to 2N−1 signal input ends in a manner of sending 2N−1 channel signals in the xDSL system. If n twisted pair line(s) is/are broken, during signal transmission, the number of signals changes to 2N−1−2n, and the 2N−1−2n signals are sent to 2N−1−2n signal input ends.

In the xDSL system, multiple xDSLs may be bound. When a part of twisted pair lines are broken, the number of the bound lines is decreased according to the change of twisted pair lines, so that the number of signals sent to the signal input ends is decreased.

The above embodiment is taken as an example. After the second twisted pair line P2 is broken, the number of input signals changes to 5. The system may select 5 signal input ends from 7 signal input ends to send signals. For example, the 5 signal input ends V1, V3, V4, V5, and V7 may be selected to send signals.

After the 5 signals are converted into 6 signals, and the 6 signals are then sent via the signal sending ends corresponding to the 6 signals.

The design method of the second conversion matrix is similar to that of the first conversion matrix.

In the method provided by a first embodiment of the present invention, since each sending end is respectively connected with a conducting wire in each twisted pair line, a (2N−1)×1 matrix formed by 2N−1 signals is pre-multiplied by a first conversion matrix to obtain a 2N×1 matrix, where elements in the 2N×1 matrix respectively correspond to 2N signals, and the 2N signals are transmitted by N twisted pair lines. In this way, the N twisted pair lines can transmit 2N−1 signals, thereby increasing the number of signal transmissions, and improving signal transmission efficiency.

In the method provided by a first embodiment of the present invention, since each signal sending end is respectively connected with a conducting wire, if n twisted pair line(s) is/are broken, signals of signals sending ends connected with the n twisted pair line(s) are influenced to be unable to be sent, that is, the number of signals of the channels capable of being transmitted changes from 2N−1 to 2N−1−2n. For example, if 1 twisted pair line is broken, signals of the signal sending end connected with twisted pair line are influenced to be unable to be transmitted. While increasing the number of signal transmissions as much as possible, the method ensures, in the case that a twisted pair line is fault, that the signals incapable of being transmitted is as few as possible.

In addition, when a twisted pair line is broken, it is only required to convert signals input by 2N−1−2n signal input ends into 2N−2n signals and then to send the 2N−2n signals via the signal sending ends respectively connected with N−n twisted pair lines. If the number of signals is changed through matrix pre-multiplication, it is only required to change the first conversion matrix to the second conversion matrix. The method is simple and convenient.

Figure 4:
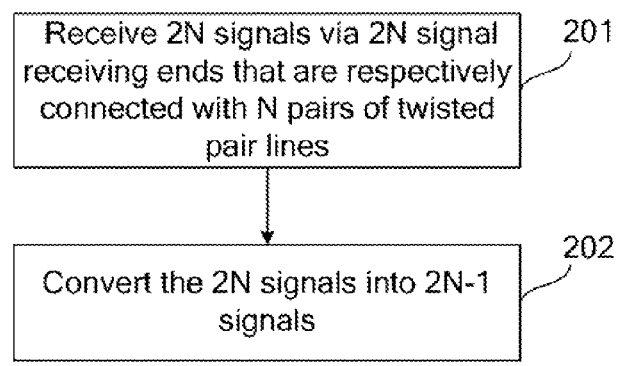
FIG. 4 is a flow chart of a second embodiment of a signal transmission method in an xDSL system according to the present invention.

FIG. 4 is a flow chart of a second embodiment of a signal transmission method in an xDSL system according to the present invention. As shown in FIG. 4, the method includes the following.

Step 201: Receive 2N signal via 2N signal receiving ends respectively connected with N twisted pair lines.

Step 202: Convert 2N signals into 2N−1 signals. Each signal in the 2N−1 signals in the step is a signal transmitted by each independent channel in the xDSL system.

The step 202 may specifically include: pre-multiplying a 2N×1 matrix formed by the 2N signals by a third conversion matrix to obtain a (2N−1)×1 matrix, where elements in the (2N−1)×1 matrix respectively correspond to 2N−1 signals; the third conversion matrix is a (2N−1)×2N matrix; and each signal in the 2N−1 signals is a signal transmitted by each independent channel in the xDSL system.

If n twisted pair line(s) is/are broken, 2N−2n signals are received via 2N−2n signal receiving ends in the 2N signal receiving ends that are respectively connected with N twisted pair lines, and the 2N−2n signals are converted into 2N−1−2n signals. The step may specifically include: pre-multiplying a (2N−2n)×1 matrix formed by the 2N−2n signals by a fourth conversion matrix to obtain a (2N−1−2n)×1 matrix, where elements in the (2N−1−2n)×1 matrix respectively correspond to 2N−1−2n signals, the fourth conversion matrix is a (2N−1−2n)×(2N−2n) matrix, and n is a natural number less than N.

FIG. 2 shows another example. If no twisted pair line is broken, 8 receiving ends, RX1, RX2, RX3, RX4, RX5, RX6, RX7, and RX8, connected with 4 twisted pair lines respectively receive 8 signals $y_1, y_2, y_3, y_4, y_5, y_6, y_7$ and $y_8$, and an 8×1 matrix formed by the 8 signals is pre-multiplied by the third conversion matrix to obtain 7 signals $x_1, x_2, x_3, x_4, x_5, x_6$, and $x_7$.

The specific calculation may be as follows:

$$\begin{bmatrix} x_1 \\ x_2 \\ x_3 \\ x_4 \\ x_5 \\ x_6 \\ x_7 \end{bmatrix} = \begin{pmatrix} 0.5 & -0.5 & 0 & 0 & 0 & 0 & 0 & 0 \\ 0 & 0 & 0.5 & -0.5 & 0 & 0 & 0 & 0 \\ 0 & 0 & 0 & 0 & 0.5 & -0.5 & 0 & 0 \\ 0 & 0 & 0 & 0 & 0 & 0 & 0.5 & -0.5 \\ 0.5 & 0.5 & -0.5 & -0.5 & 0 & 0 & 0 & 0 \\ 0 & 0 & 0 & 0 & 0.5 & 0.5 & -0.5 & -0.5 \\ 0.5 & 0.5 & 0.5 & 0.5 & -0.5 & -0.5 & -0.5 & -0.5 \end{pmatrix} * \begin{bmatrix} y_1 \\ y_2 \\ y_3 \\ y_4 \\ y_5 \\ y_6 \\ y_7 \\ y_8 \end{bmatrix} \quad (6)$$

If a certain twisted pair line is broken, for example, the second twisted pair line P2 is broken, 6 signals are received in the remaining 3 twisted pair lines, and the 6 signals received by the receiving ends may be converted into 5 signals through the fourth conversion matrix, referring to FIG. 3. The fourth conversion matrix may be as follows:

$$\begin{bmatrix} 0.5 & -0.5 & 0 & 0 & 0 & 0 \\ 0 & 0 & 0.5 & -0.5 & 0 & 0 \\ 0 & 0 & 0 & 0 & 0.5 & 0.5 \\ 0.5 & 0.5 & -0.5 & -0.5 & 0 & 0 \\ 0.5 & 0.5 & 0.5 & 0.5 & -0.5 & -0.5 \end{bmatrix} \quad (7)$$

A 6×1 matrix formed by the 6 signals is pre-multiplied by the matrix (7) to obtain a 5×1 matrix. Elements in the 5×1 matrix respectively correspond to 5 signals $x_1, x_3, x_4, x_5$, and $x_7$.

As shown in FIG. 2 and FIG. 3, when the total number of twisted pair lines is 2, that is, the value of N is 2, the number of signal sending ends is 2×2=4; the number of signal input ends is 2×2−1=3; and the number of signal receiving ends is 2×2=4.

When no twisted pair line is broken, for 3 signals $x_1, x_2$, and $x_3$ received on the signal input ends, a 3×1 matrix formed by the three signals is pre-multiplied by the first conversion matrix to obtain a 4×1 matrix. Elements in the 4×1 matrix respectively correspond to 4 signals $y_1, y_2, y_3$, and $y_4$. The specific calculation is as follows:

$$\begin{pmatrix} y_1 \\ y_2 \\ y_3 \\ y_4 \end{pmatrix} = \begin{bmatrix} 1 & 0 & 0.5 \\ -1 & 0 & 0.5 \\ 0 & 1 & -0.5 \\ 0 & -1 & -0.5 \end{bmatrix} * \begin{pmatrix} x_1 \\ x_2 \\ x_3 \end{pmatrix} = \begin{pmatrix} x_1 + \frac{x_3}{2} \\ -x_1 + \frac{x_3}{2} \\ x_2 + \left(-\frac{x_3}{2}\right) \\ -x_2 + \left(-\frac{x_3}{2}\right) \end{pmatrix} \quad (8)$$

After the 4 signal receiving ends receive the four signals $y_1, y_2, y_3$, and $y_4$, a 4×1 matrix formed by the four signals may be pre-multiplied by the third conversion matrix to obtain a 3×1 matrix, where all elements in the 3×1 matrix respectively correspond to 3 signals $x_1, x_2$, and $x_3$. The specific calculation process is as follows:

$$\begin{bmatrix} 0.5 & -0.5 & 0 & 0 \\ 0 & 0 & 0.5 & -0.5 \\ 0.5 & 0.5 & -0.5 & -0.5 \end{bmatrix} * \quad (9)$$

$$\begin{pmatrix} y_1 \\ y_2 \\ y_3 \\ y_4 \end{pmatrix} = \begin{bmatrix} 0.5 & -0.5 & 0 & 0 \\ 0 & 0 & 0.5 & -0.5 \\ 0.5 & 0.5 & -0.5 & -0.5 \end{bmatrix} * \begin{pmatrix} x_1 + \frac{x_3}{2} \\ -x_1 + \frac{x_3}{2} \\ x_2 + \left(-\frac{x_3}{2}\right) \\ -x_2 + \left(-\frac{x_3}{2}\right) \end{pmatrix} = \begin{pmatrix} x_1 \\ x_2 \\ x_3 \end{pmatrix}$$

If a second twisted pair line is broken, for 1 signal $x_1$ received by the signal input end, a 1×1 matrix formed by the 1 signal may be pre-multiplied by a second conversion matrix to obtain a 2×1 matrix. The specific calculation is as follows:

$$\begin{pmatrix} y_1 \\ y_2 \end{pmatrix} = \begin{bmatrix} 1 \\ -1 \end{bmatrix} * (x_1) = \begin{pmatrix} x_1 \\ -x_1 \end{pmatrix} \quad (10)$$

At the receiving end, the 2×1 matrix formed by 2 signals is pre-multiplied by the fourth conversion matrix to obtain the signal $x_1$. The specific calculation process is as follows:

$$[0.5 \quad -0.5] * \begin{pmatrix} y_1 \\ y_2 \end{pmatrix} = [0.5 \quad -0.5] * \begin{pmatrix} x_1 \\ -x_1 \end{pmatrix} = (x_1) \quad (11)$$

In each embodiment of the present invention, the first conversion matrix may satisfy the following conditions.

(1) A sum of elements in each column is 0. Since each twisted pair line corresponds to two rows of elements in a conversion matrix, and the sum of elements in each column is 0, it may be ensured that signals transmitted in each twisted pair line are accumulation of signals in each conducting wire. As for xDSL technologies, all user signals are transmitted by using differential signals.

(2) The number of positive numbers is the same as the number of negative numbers in each column. In this way, it may be ensured that each differential signal is distributed symmetrically in each twisted pair line. Transmission quality of signals is better, and the capability of resisting common-mode cross-talk is stronger.

(3) The product of the first conversion matrix and the third conversion matrix is a diagonal matrix, and the product of the fourth conversion matrix is a diagonal matrix. In this way, cross-talk does not exist between signals received by a receiving device, that is, signals received by the $x^{th}$ signal receiving end do not include signals received by the $y^{th}$ signal receiving end.

If the product of the first conversion matrix and the second conversion matrix is not a diagonal matrix, or the product of the second conversion matrix and the fourth conversion matrix is not a diagonal matrix, cross-talk between signals received by signal receiving ends may be eliminated in another manner. For example, the cross-talk between signals received by the receiving ends may be eliminated by using vector (Vector) technologies.

Figure 5:
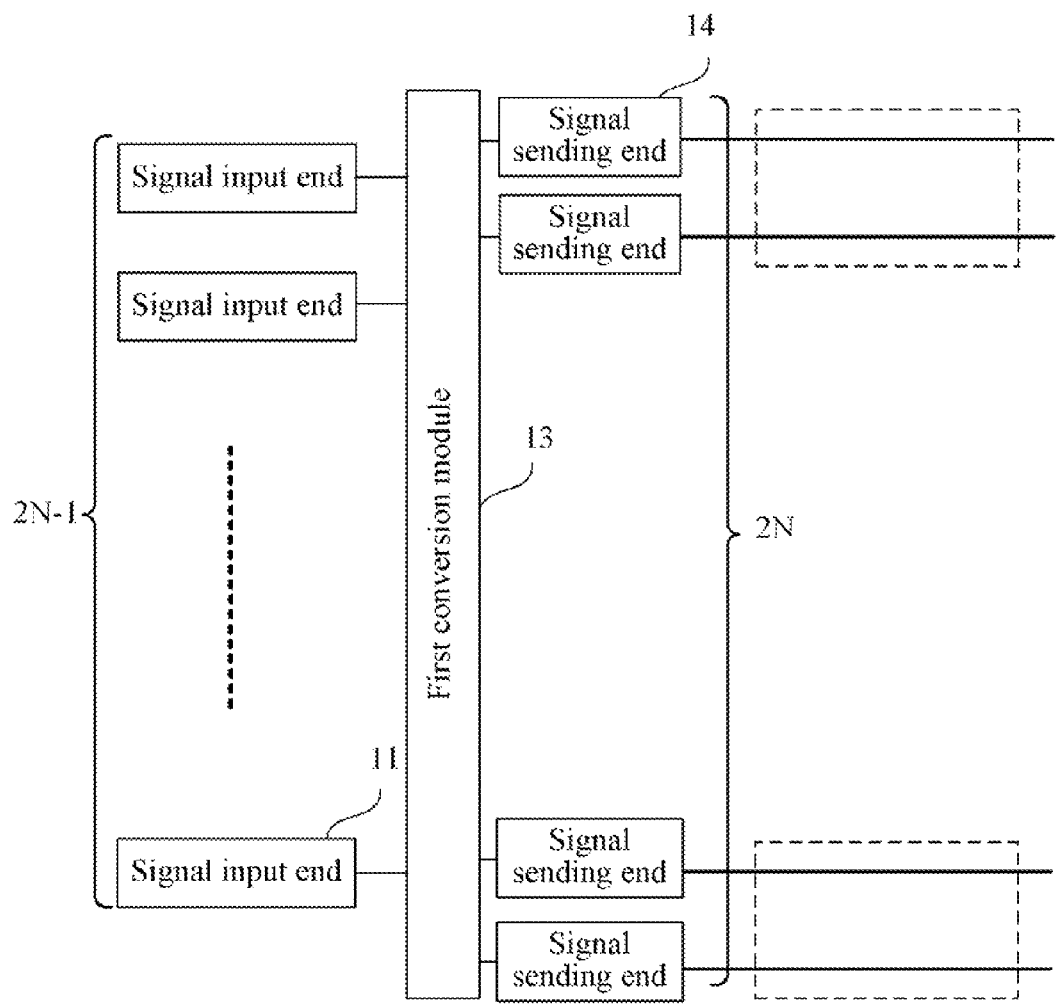
FIG. 5 is a schematic structural diagram of a first embodiment of a signal sending device in an xDSL system according to the present invention.

FIG. 5 is a schematic structural diagram of a first embodiment of a signal sending device in an xDSL system according to the present invention. The sending device includes 2N−1 signal input ends 11, a first conversion module 13, and 2N signal sending ends 14. The 2N−1 signal input ends 11 are respectively configured to receive signals transmitted by independent channels in the xDSL system. The first conversion module 13 is configured to pre-multiply a (2N−1)×1 matrix formed by 2N−1 signals by a first conversion matrix to obtain a 2N×1 matrix, where elements in the 2N×1 matrix respectively correspond to 2N signals, and the first conversion matrix is a 2N×(2N−1) matrix. The 2N signal sending ends 14 are respectively connected with a conducting wire in N twisted pair lines, and are configured to send each of 2N signals obtained by the first conversion module 13 via a conducting wire in N twisted pair lines.

When n twisted pair line(s) is/are broken, the first conversion module 13 may specifically pre-multiply a (2N−1−2n)×1 matrix formed by 2N−1−2n signals by a second conversion matrix to obtain a (2N−2n)×1 matrix, where elements in the (2N−2n)×1 matrix respectively correspond to 2N signals, and the second conversion matrix is a (2N−2n)×(2N−1−2n) matrix. The 2N−2n sending ends, respectively connected with N−n twisted pair lines where no fault occurs, are configured to send the 2N−2n signals.

Figure 6:
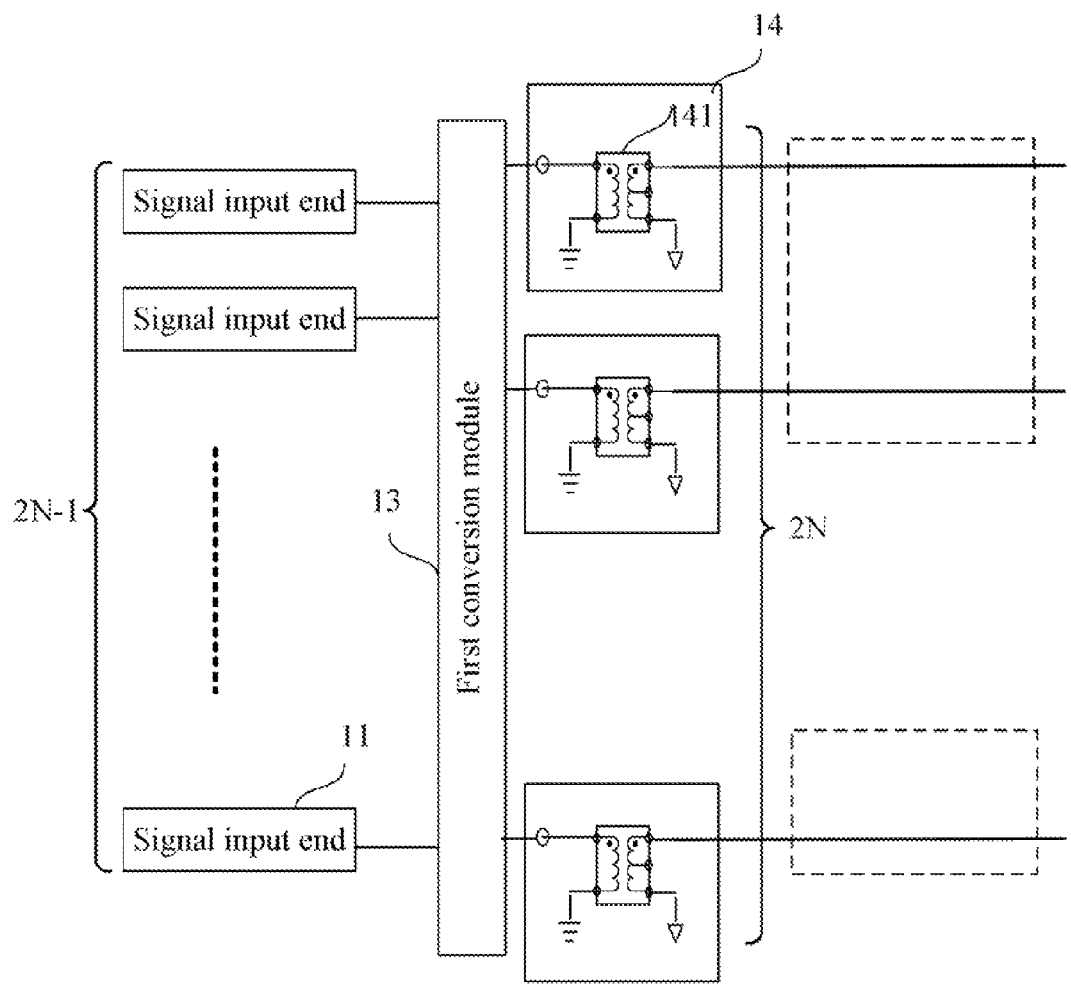
FIG. 6 is a schematic structural diagram of a second embodiment of a signal sending device in an xDSL system according to the present invention.

FIG. 6 is a schematic structural diagram of a second embodiment of a signal sending device in an xDSL system according to the present invention. In the embodiment, each signal sending end includes a first transformer 141, where an end of the first transformer 141 is connected with the first conversion module 13, and the other end is connected with any one conducting wire in N twisted pair lines. The first transformer 141 is configured to convert a voltage of the signal converted by the first conversion module 13 into a voltage transmissible in a twisted pair line and send the signal having the converted voltage via the twisted pair line.

Figure 7:
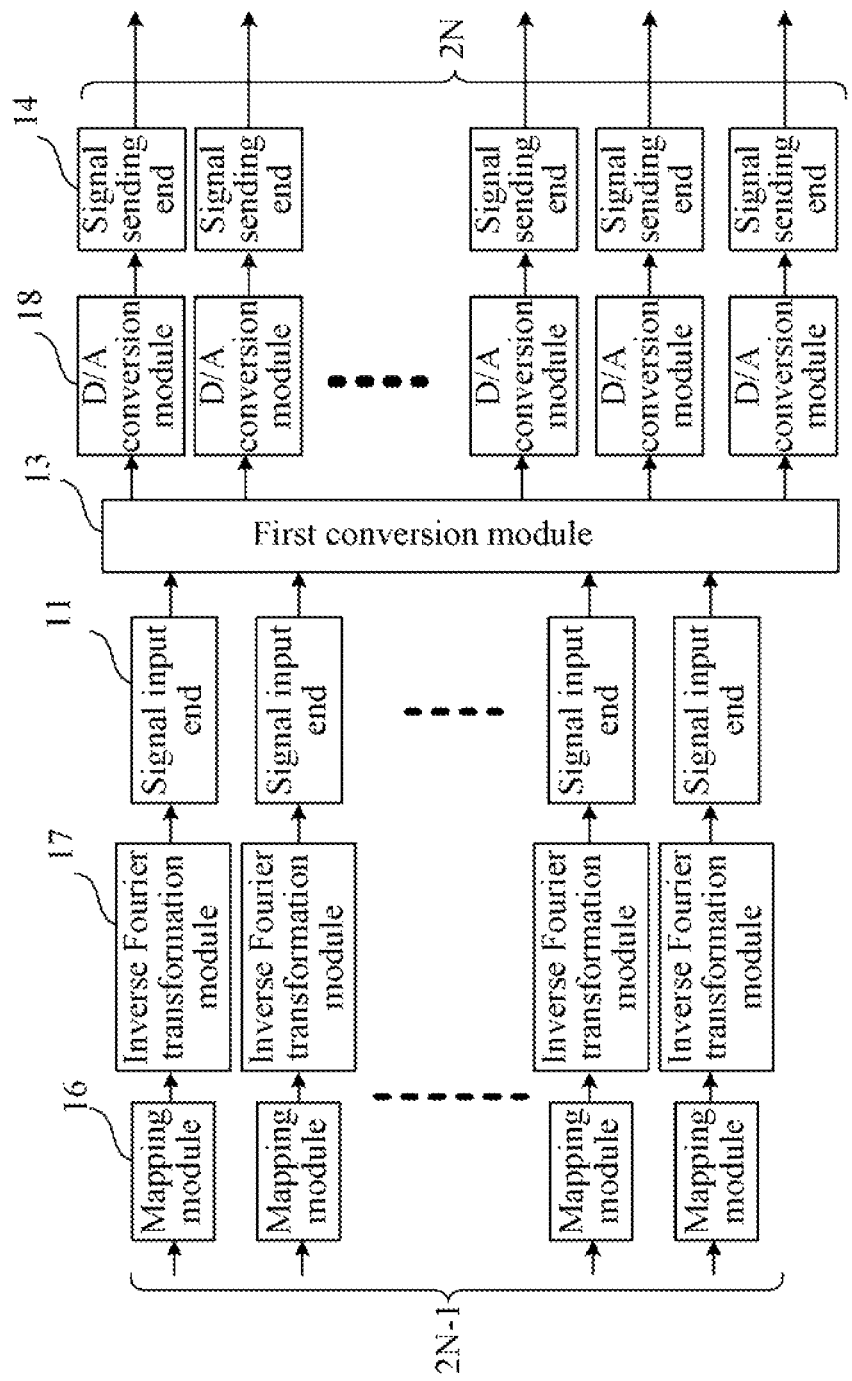
FIG. 7 is a schematic structural diagram of a second embodiment of a signal sending device in an xDSL system according to the present invention.

FIG. 7 is a schematic structural diagram of a third embodiment of a signal sending device in an xDSL system according to the present invention. In the embodiment, the signal sending device further includes a mapping module 16, an inverse Fourier transformation module 17, and a D/A conversion module 18. The mapping module 16 is configured to perform constellation point mapping on a signal. The inverse Fourier transformation module 17 is connected with the mapping module 16 and is configured to perform inverse Fourier transformation on the constellation-point-mapped signal to convert the signal into a time domain signal and send the time domain signal to a signal input end 11. The D/A conversion module 18 is respectively connected with the first conversion module 13 and the signal sending end 14 and is configured to perform D/A conversion on a signal output by the first conversion module 13 to convert the signal into an analog signal, and send the converted analog signal to the signal sending end 14.

In the embodiment shown in FIG. 7, the positions of the signal input end and the first conversion module in the xDSL system are shown. It is should be noted that, the embodiment does not provide a complete structure of the sending device of the xDSL system. The embodiment shown in FIG. 7 may further include other modules in the sending device of the xDSL system.

Figure 8:
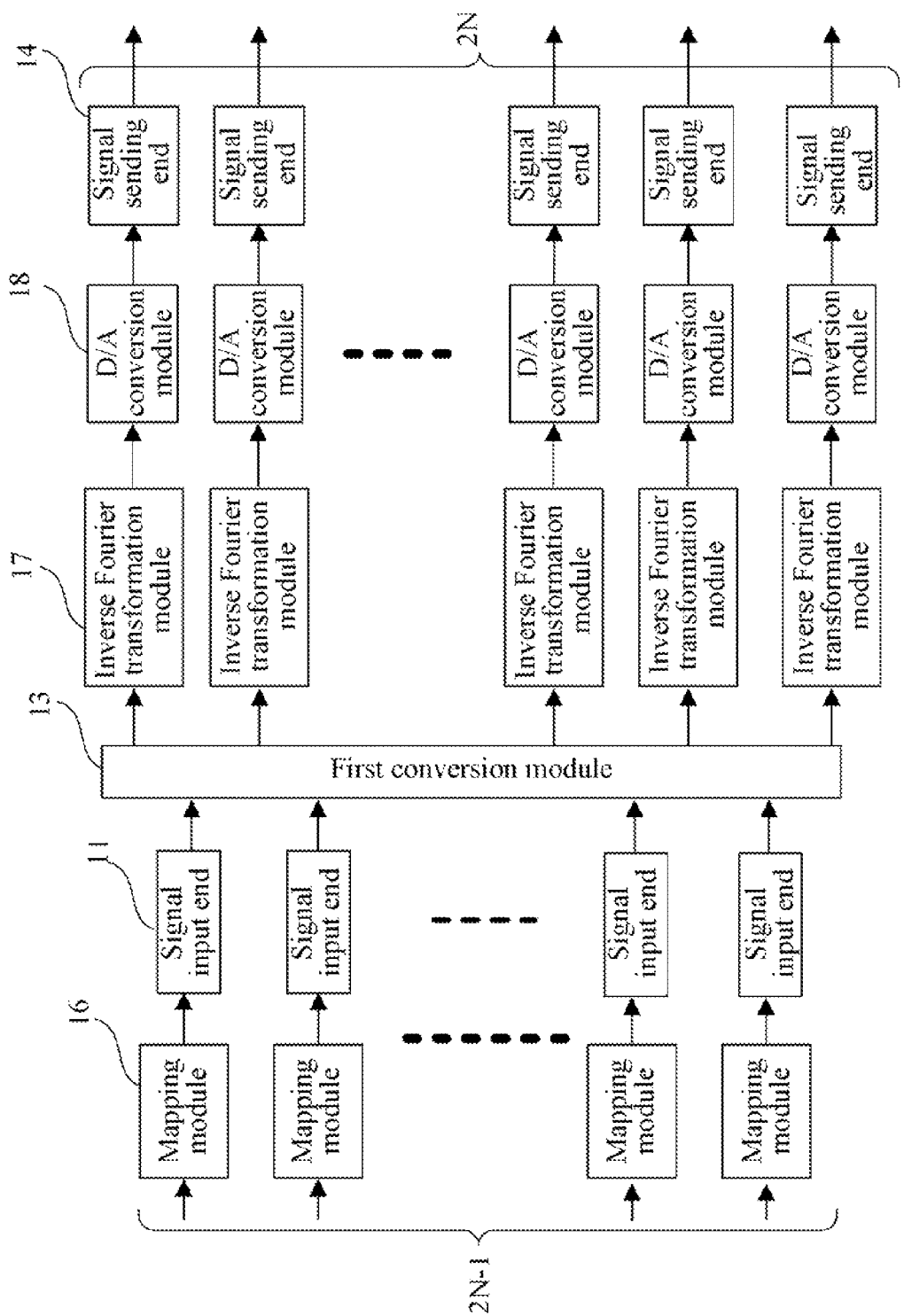
FIG. 8 is a schematic structural diagram of a fourth embodiment of a signal sending device in an xDSL system according to the present invention.

FIG. 8 is a schematic structural diagram of a fourth embodiment of a signal sending device in an xDSL system according to the present invention. The difference between the embodiment and the embodiment shown in FIG. 7 is that: in the embodiment shown in FIG. 8, connection relationships between an inverse Fourier transformation module 17 and other modules are different from those in the embodiment shown in FIG. 7. In the embodiment shown in FIG. 8, the inverse Fourier transformation module 17 is respectively connected with a first conversion module 13 and a D/A conversion module 18, and the first conversion module 13 is connected with a signal input end 11.

In the embodiment shown in FIG. 8, after being converted by the first conversion module into 2N signals, the 2N−1 signals input by the signal input ends pass through the inverse Fourier transformation modules 17, which convert the signals into time domain signals, and the signals are sent via the signal sending ends 14.

Figure 9:
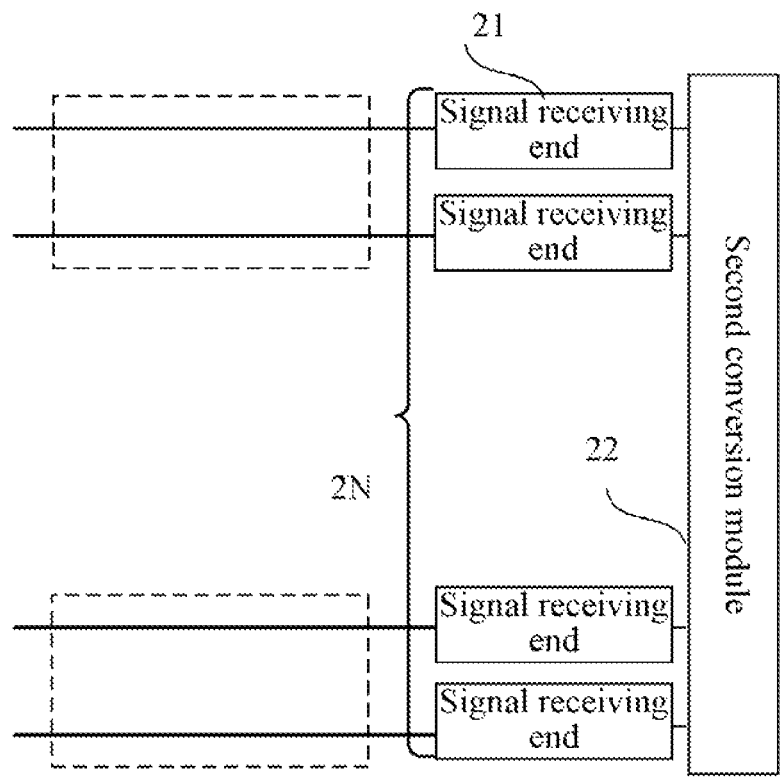
FIG. 9 is a schematic structural diagram of a first embodiment of a signal receiving device in an xDSL system according to the present invention.

FIG. 9 is a schematic structural diagram of a first embodiment of a signal receiving device in an xDSL system according to the present invention. The device includes 2N signal receiving ends 21 and a second conversion module 22. The 2N signal receiving ends 21 are respectively connected with a conducting wire in N twisted pair lines and are configured to receive 2N signals. The second conversion module 22 is configured to pre-multiply a 2N×1 matrix formed by the 2N signals by a third conversion matrix to obtain a (2N−1)×1 matrix, where elements in the (2N−1)×1 matrix respectively correspond to 2N−1 signals, the third conversion matrix is a (2N−1)×2N matrix, each signal in the 2N−1 signals is a signal transmitted by each independent channel in the xDSL system, and N is a natural number greater than 1.

The second conversion module 22 may be further configured to convert 2N−2n signals received via the 2N signal receiving ends into 2N−1−2n signals when n twisted pair line(s) is/are faulty. Specifically, the second conversion module 22 may be specifically configured to pre-multiply a (2N−2n)×1 matrix formed by the 2N−2n signals by a fourth conversion matrix to obtain a (2N−1−2n)×1 matrix, where elements in the (2N−1−2n)×1 matrix respectively correspond to 2N−1−2n signals, and the fourth conversion matrix is a (2N−1−2n)×(2N−2n) matrix.

Figure 10:
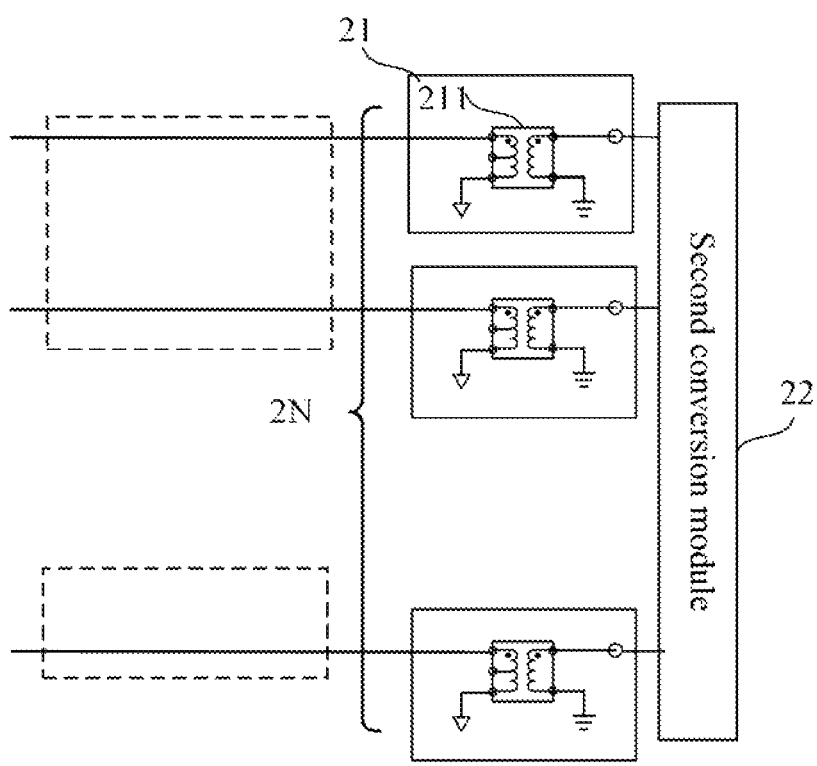
FIG. 10 is a schematic structural diagram of a second embodiment of a signal receiving device in an xDSL system according to the present invention.

FIG. 10 is a schematic structural diagram of a second embodiment of a signal receiving device in an xDSL system according to the present invention. In the embodiment, each signal receiving end 21 includes a second transformer 211, where an end of the second transformer 211 is connected with a second conversion module 22, and the other end is connected with any one conducting wire in N twisted pair lines, and the second transformer 211 is configured to send signals transmitted by twisted pair lines to the second conversion module 22.

Figure 11:
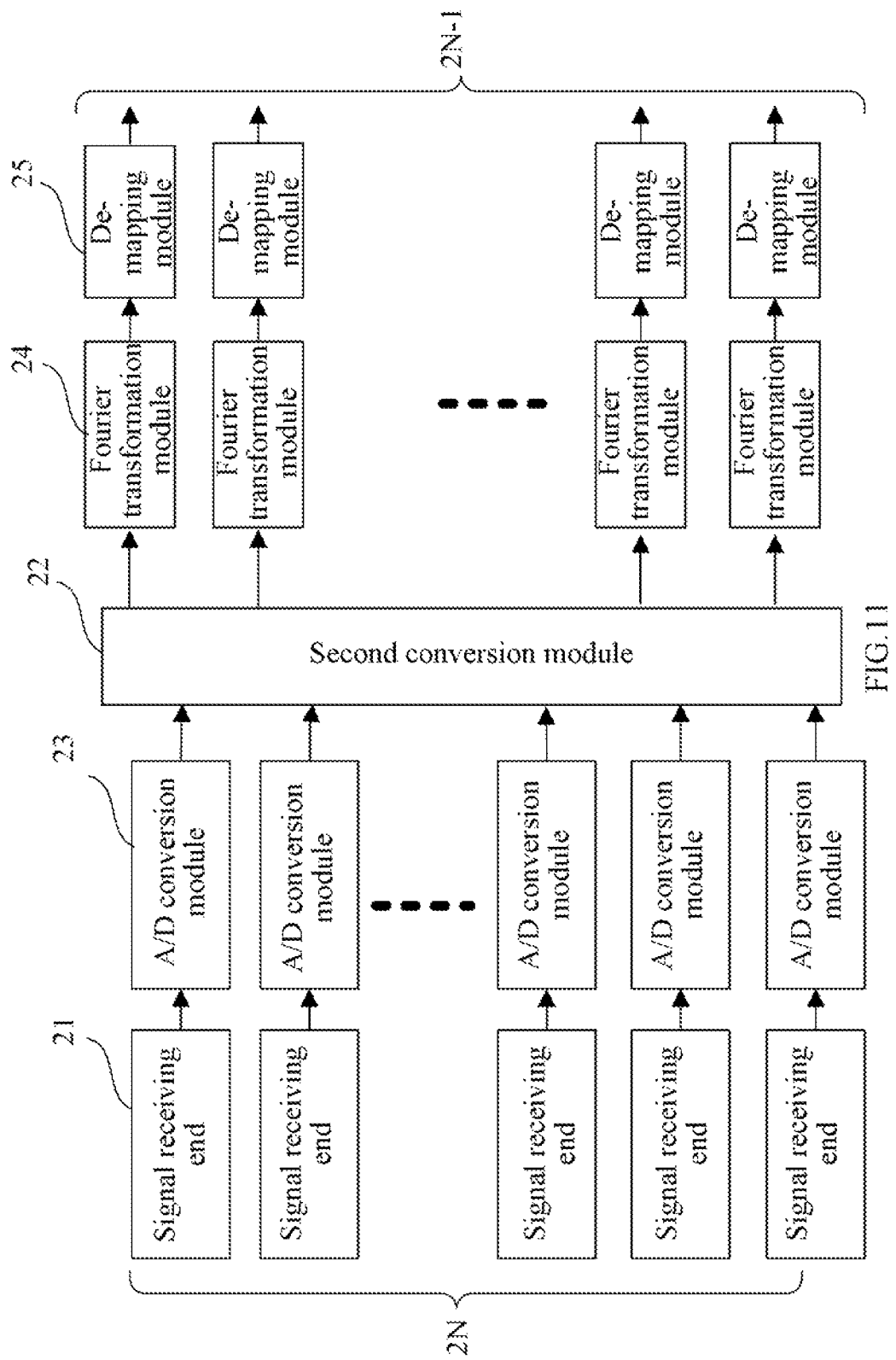
FIG. 11 is a schematic structural diagram of a third embodiment of a signal receiving device in an xDSL system according to the present invention.

FIG. 11 shows a schematic structural diagram of a third embodiment of a signal receiving device in an xDSL system according to the present invention. The embodiment further includes an A/D conversion module 23, a Fourier transformation module 24, and a de-mapping module 25. The A/D conversion module 23 is respectively connected with the signal receiving end 21 and the second conversion module 22 and is configured to convert an analog signal received by the signal receiving end 21 into a digital signal and then send the converted signal to the second conversion module 22. The Fourier transformation module 24 is connected with the second conversion module 22 and is configured to perform Fourier transformation on a signal output by the second conversion module 22 to convert the signal output by the second conversion module 22 into a frequency domain signal. The de-mapping module 25 is connected with the Fourier transformation module 24 and is configured to perform constellation point de-mapping on the Fourier-transformed signal.

Figure 12:
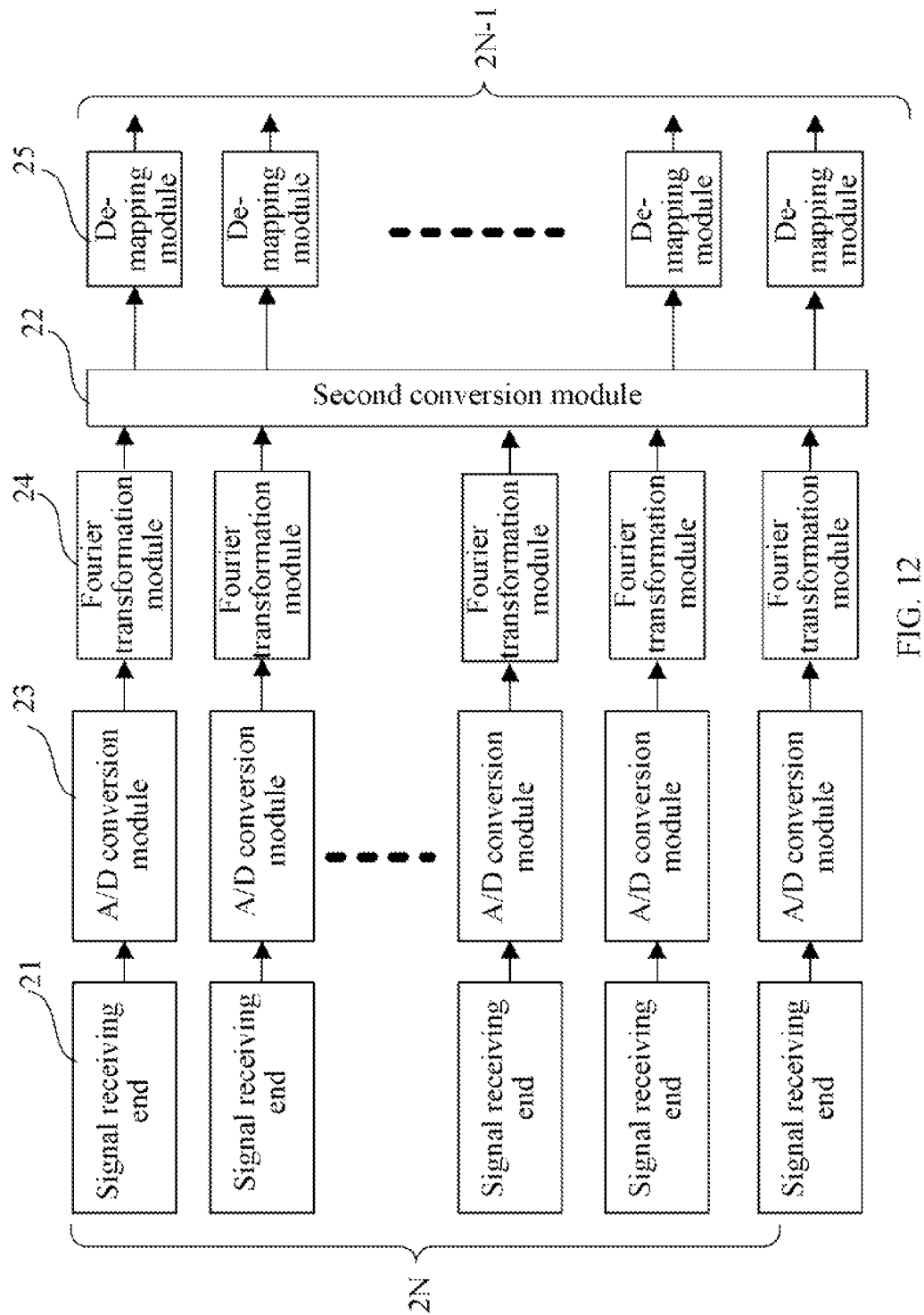
FIG. 12 is a schematic structural diagram of a fourth embodiment of a signal receiving device in an xDSL system according to the present invention.

FIG. 12 is a schematic structural diagram of a fourth embodiment of a signal receiving device in an xDSL system according to the present invention. The difference between this embodiment and the embodiment shown in FIG. 11 is that: in FIG. 12, connection relationships between a Fourier transformation module 24 and other modules are different from those in FIG. 11. In FIG. 12, the Fourier transformation module 24 is respectively connected with an A/D conversion module 23 and a second conversion module 22, and the second conversion module 22 is connected with a de-mapping module 25.

In the embodiment, the Fourier transformation module 24 converts an A/D-converted digital signal into a frequency domain signal, and sends the frequency domain signal to the second conversion module. A signal output by the second conversion module is sent to the de-mapping module 25 for constellation point de-mapping.

In the embodiment shown in FIG. 12, the positions of the signal receiving end and the second conversion module in the xDSL system are shown. The embodiment does not provide a complete structure of the receiving device of the xDSL system. The embodiment shown in FIG. 12 may further include other modules in the receiving device of the xDSL system.

Embodiments of the present invention further provides an xDSL signal transmission system, which includes N twisted pair lines, the signal sending device described in the preceding embodiments, and the signal receiving device described in the preceding embodiments. The 2N signal sending ends of the signal sending device are respectively connected with a conducting wire of N twisted pair lines, and the 2N signal receiving ends of the signal receiving device are respectively connected with a conducting wire of N twisted pair lines.

In the devices and system provided by embodiments of the present invention, since each sending end is respectively connected with a conducting wire in each twisted pair line, a (2N−1)×1 matrix formed by 2N−1 signals is pre-multiplied by a first conversion matrix to obtain a 2N×1 matrix, where elements in the 2N×1 matrix respectively correspond to 2N signals, and the 2N signals is transmitted by N twisted pair lines. In this way, the N twisted pair lines can transmit 2N−1 signals, thereby increasing the number of signal transmissions, and improving signal transmission efficiency.

In addition, when a twisted pair line is broken, it is only required to convert signals input by 2N−1−2n signal input ends into 2N−2n signals and then to send the 2N−2n signals via the signal sending ends that are respectively connected with N−n twisted pair lines. If the number of signals is changed through matrix pre-multiplication, it is only required to change the first conversion matrix to the second conversion matrix for the sending end and change the third conversion matrix to the fourth matrix for the receiving end. The method is simple and convenient.

Persons of ordinary skill in the art may understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as an ROM, an RAM, a magnetic disk or an optical disk.

Finally, it should be noted that the foregoing embodiments are merely provided for describing the technical solutions of the present invention, but are not intended to limit the present invention. It should be understood by persons of ordinary skill in the art that although the present invention has been described in detail with reference to the foregoing embodiments, modifications may still be made to the technical solutions described in the foregoing embodiments, or equivalent replacements can be made to some technical features in the technical solutions, and these modifications or replacements do not cause the essence of corresponding technical solutions to depart from the spirit and scope of the technical solutions of the embodiments of present invention.

What is claimed is:

1. A signal transmission method in an xDSL system, comprising:
receiving 2N−1 signals from 2N−1 signal input ends, wherein each signal in the 2N−1 signals is a signal transmitted by an independent channel in the xDSL system; and
pre-multiplying a (2N−1)×1 matrix formed by the 2N−1 signals by a first conversion matrix to obtain a 2N×1 matrix, wherein elements in the 2N×1 matrix respectively correspond to 2N signals, and the first conversion matrix is a 2N×(2N−1) matrix; and
sending the 2N signals via N twisted pair lines respectively, wherein N is a natural number greater than 1.

2. The method according to claim 1, further comprising:
if n twisted pair line(s) is/are broken, receiving 2N−1−2n signals from 2N−1−2n signal input ends in 2N−1 signal input ends, pre-multiplying a (2N−1−2n)×1 matrix formed by the 2N−1−2n signals by a second conversion matrix to obtain a (2N−2n)×1 matrix, wherein elements in the (2N−2n)×1 matrix respectively correspond to 2N−2n signals, and the second conversion matrix is a (2N−2n)×(2N−1−2n) matrix; and sending the 2N−2n signals via N−n twisted pair lines respectively, wherein n is a natural number less than N.

3. The method according to claim 1, wherein in the first conversion matrix, a sum of elements in each column is 0, and the number of positive numbers is the same as the number of negative numbers in each column.

4. A signal transmission method in an xDSL system, comprising:
receiving 2N signals via 2N signal receiving ends respectively connected with N twisted pair lines; and
pre-multiplying a 2N×1 matrix formed by the 2N signals by a first conversion matrix to obtain a (2N−1)×1 matrix, wherein elements in the (2N−1)×1 matrix respectively correspond to 2N−1 signals, the first conversion matrix is a (2N−1)×2N matrix, each signal in the 2N−1 signals is a signal transmitted by an independent channel in the xDSL system, and N is a natural number greater than 1.

5. The method according to claim 4, further comprising:
if n twisted pair line(s) is/are broken, receiving 2N−2n signals from 2N−2n signal receiving ends in the 2N signal receiving ends that are respectively connected with the N twisted pair lines; and
pre-multiplying a (2N−2n)×1 matrix formed by the 2N−2n signals by a second conversion matrix to obtain a (2N−1−2n)×1 matrix, wherein elements in the (2N−1−2n)×1 matrix respectively correspond to 2N−1−2n signals, the second conversion matrix is a (2N−1−2n)×(2N−2n) matrix, and n is a natural number less than N.

6. A signal sending device in an xDSL system, comprising:
2N−1 signal input ends, respectively configured to receive a signal transmitted by an independent channel in the xDSL system;
a first conversion module, configured to pre-multiply a (2N−1)×1 matrix formed by 2N−1 signals by a first conversion matrix to obtain a 2N×1 matrix, wherein elements in the 2N×1 matrix respectively correspond to 2N signals, and the first conversion matrix is a 2N×(2N−1) matrix; and
2N signal sending ends, respectively connected with a conducting wire in N twisted pair lines, and configured to send each of the 2N signals obtained by the first conversion module via a conducting wire in N twisted pair lines, wherein N is a natural number greater than 1.

7. The device according to claim 6, wherein the first conversion module is further configured to, when n twisted pair line(s) is/are faulty, receive 2N−1−2n signals from 2N−1−2n signal input ends in the 2N−1 signal input ends, pre-multiply a (2N−1−2n)×1 matrix formed by the 2N−1−2n signals by a second conversion matrix to obtain a (2N−2n)×1 matrix, wherein elements in the (2N−2n)×1 matrix respectively correspond to 2N−2n signals, and the second conversion matrix is a (2N−2n)×(2N−1−2n) matrix;
wherein the 2N−2n signals are sent by 2N−2n sending ends, respectively connected with N−n twisted pair lines without a fault; and
n is a natural number less than N.

8. The device according to claim 6, wherein each sending end comprises a first transformer, wherein an end of the first transformer is connected with the first conversion module, and the other end is connected with a conducting wire in the N twisted pair lines, and the first transformer is configured to convert a voltage of the signal converted by the first conversion module into a voltage transmissible in the twisted pair line, and then send the signal having the converted voltage via the twisted pair line.

9. A signal receiving device in an xDSL system, comprising:
2N signal receiving ends, respectively connected with a conducting wire in N twisted pair lines, and configured to receive 2N signals; and
a first conversion module, configured to pre-multiply a 2N×1 matrix formed by the 2N signals by a second conversion matrix to obtain a (2N−1)×1 matrix, wherein elements in the (2N−1)×1 matrix respectively correspond to 2N−1 signals, the second conversion matrix is a (2N−1)×2N matrix, each signal in the 2N−1 signals is a signal transmitted by an independent channel in the xDSL system, and N is a natural number greater than 1.

10. The device according to claim 9, wherein the first conversion module is further configured to, when n twisted pair line(s) is/are faulty, pre-multiply a (2N−2n)×1 matrix formed by the 2N−2n signals by a third conversion matrix to obtain a (2N−1−2n)×1 matrix, wherein elements in the (2N−1−2n)×1 matrix respectively correspond to 2N−1−2n signals, and the third conversion matrix is a (2N−1−2n)×(2N−2n) matrix.

11. The device according to claim 9, wherein each signal receiving end comprises a first transformer, wherein one end of the first transformer is connected with the first conversion module, and the other end is connected with a conducting wire in the N twisted pair lines, and the first transformer is configured to send a signal transmitted by the twisted pair line to the first conversion module.

12. An xDSL signal transmission system, comprising N twisted pair lines, a signal sending device and a signal receiving device;
the signal sending device comprising:
2N−1 signal input ends, respectively configured to receive a signal transmitted by an independent channel;
a first conversion module, configured to pre-multiply a (2N−1)×1 matrix formed by 2N−1 signals by a first conversion matrix to obtain a 2N×1 matrix, wherein elements in the 2N×1 matrix respectively correspond to 2N signals, and the first conversion matrix is a 2N×(2N−1) matrix; and
2N signal sending ends, respectively connected with a conducting wire in the N twisted pair lines, and configured to send each of the 2N signals obtained by the first conversion module via a conducting wire in the N twisted pair lines, wherein N is a natural number greater than 1;
and the signal receiving device comprising:
2N signal receiving ends, respectively connected with a conducting wire in the N twisted pair lines, and configured to receive 2N signals; and
a second conversion module, configured to pre-multiply a 2N×1 matrix formed by the 2N signals by a third conversion matrix to obtain a (2N−1)×1 matrix, wherein elements in the (2N−1)×1 matrix respectively correspond to 2N−1 signals, the third conversion matrix is a (2N−1)×2N matrix, each signal in the 2N−1 signals is a signal transmitted by an independent channel in the xDSL system, and N is a natural number greater than 1;
wherein 2N signal sending ends of the signal sending device are respectively connected with a conducting wire of the N twisted pair lines, and 2N signal receiving ends of the signal receiving device are respectively connected with a conducting wire of the N twisted pair lines.

* * * * *